United States Patent
Sobejko et al.

(10) Patent No.: US 9,318,754 B2
(45) Date of Patent: Apr. 19, 2016

(54) ENHANCED BONDING IN FUEL CELLS

(75) Inventors: Paul Sobejko, North Vancouver (CA); Shinichiro Imura, Nishinomiya (JP); David Lo, Burnaby (CA); Goro Fujita, Neyagawa (JP); Takashi Yasuo, Kobe (JP); Alexey Demykin, Vancouver (CA); Robert J. Porter, Vancouver (CA)

(73) Assignees: Intelligent Energy Limited, Loughborough (GB); Sanyo Electric Co., Ltd., Osaka (JP)

( * ) Notice: Subject to any disclaimer, the term of this patent is extended or adjusted under 35 U.S.C. 154(b) by 855 days.

(21) Appl. No.: 13/596,577

(22) Filed: Aug. 28, 2012

(65) Prior Publication Data

US 2014/0234745 A1  Aug. 21, 2014

(51) Int. Cl.
  *H01M 8/00* (2006.01)
  *H01M 8/02* (2006.01)
  *H01M 8/04* (2006.01)

(52) U.S. Cl.
  CPC .......... H01M 8/0297 (2013.01); H01M 8/0226 (2013.01); H01M 8/0247 (2013.01); *H01M 2250/30* (2013.01); *Y02B 90/18* (2013.01); *Y02E 60/50* (2013.01); *Y02P 70/56* (2015.11)

(58) Field of Classification Search
  CPC ............ H01M 8/0297; H01M 8/0206; H01M 8/0213; H01M 8/0215; H01M 8/0223; H01M 8/0234; H01M 8/0236; H01M 8/0241; H01M 8/0247
  See application file for complete search history.

(56) References Cited

U.S. PATENT DOCUMENTS

| 7,205,057 | B2 | 4/2007 | McLean |
| 7,632,587 | B2 | 12/2009 | McLean et al. |
| 8,129,065 | B2 | 3/2012 | Schrooten et al. |
| 8,795,919 | B2 | 8/2014 | Fujita et al. |
| 2003/0108731 | A1* | 6/2003 | Mercuri ................ C04B 35/536 428/304.4 |
| 2005/0053819 | A1* | 3/2005 | Paz ........................ H01M 4/90 429/425 |
| 2006/0040168 | A1* | 2/2006 | Sridhar ................. B82Y 30/00 429/482 |
| 2008/0311458 | A1 | 12/2008 | Schrooten et al. |
| 2009/0081493 | A1 | 3/2009 | Schrooten et al. |
| 2009/0297895 | A1 | 12/2009 | McLean et al. |
| 2010/0183955 | A1 | 7/2010 | McLean et al. |
| 2011/0003229 | A1 | 1/2011 | Schrooten et al. |
| 2011/0165495 | A1 | 7/2011 | Schrooten et al. |
| 2012/0003568 | A1 | 1/2012 | Schrooten |
| 2012/0276467 | A1* | 11/2012 | Shong ................. H01M 8/2425 429/457 |

FOREIGN PATENT DOCUMENTS

WO  WO-2011/079377 A1  7/2011
WO  WO-2014/035859 A1  3/2014

OTHER PUBLICATIONS

"International Application Serial No. PCT/US2013/056564, International Preliminary Report on Patentability mailed Mar. 12, 2015", 11 pgs.
"International Application Serial No. PCT/US2013/056564, International Search Report mailed Jan. 17, 2014", 2 pgs.
"International Application Serial No. PCT/US2013/056564, Written Opinion mailed Jan. 17, 2014", 9 pgs.

* cited by examiner

*Primary Examiner* — Kenneth Douyette
(74) *Attorney, Agent, or Firm* — Schwegman Lundberg & Woessner, P.A.

(57) ABSTRACT

Methods, systems, and articles relating to enhanced bonding of layers in a planar fuel cell. A planar fuel cell having a composite layer is bonded to an outer layer (e.g., a fuel or fluid manifold) using intrusions that extend through an electrolyte layer and into an underlying layer (e.g., a substrate component or a current-collector component).

18 Claims, 4 Drawing Sheets

ENHANCED BONDING IN FUEL CELLS

FIELD OF THE INVENTION

The subject matter of the present invention relates to coupling the components of fuel cell systems.

BACKGROUND

Successive generations of portable electronic devices tend to trend smaller in size while provide increased performance. As electronic components are designed smaller in size and incorporate sophisticated and complex technology, the demands on the associated power supply usually increase. For instance, the power supply may need to occupy less volume or possess a smaller footprint so that the overall device can accommodate the additional technology or decrease in overall size. Further, the additional technology may require that the power supply last for longer periods of time or that power be delivered at uniform rates for steady electronic component performance.

One example of a power supply is a fuel cell system. A fuel cell system may include one or more fuel cell layers, each layer including one or more anodes and cathodes with an electrolyte membrane disposed between the anode(s) and cathode(s). A small, layered fuel cell system must be robust, while accommodating the reduced space requirements.

A need exists for enhanced bonding of layered fuel cell components.

SUMMARY

In some embodiments, the present invention includes a planar fuel cell assembly comprising a composite layer and a plurality of electrode components. The composite layer includes a plurality of interconnect components and a plurality of ion-conducting components. The electrode components are disposed on a first side and a second side of the composite layer, and include a plurality of anode components and a plurality of cathode components. The first side is opposite the second side. At least one intrusion is formed in the first side of the composite layer, where the at least one intrusion extends completely through a first electrode component and partly through the interconnect component underlying the first electrode component. A first bonding component is disposed in the at least one intrusion and contacts the first electrode component and the interconnect component underlying the first electrode component. A fluid manifold is disposed over the at least one intrusion and bonded to the composite layer by the first bonding component. In some embodiments, the at least one intrusion includes a channel while in further embodiments the at least one intrusion includes a cavity.

In yet further embodiments, the present invention includes methods of generating power. The methods include directing a fuel into a fluid plenum of a planar fuel cell assembly of the invention, wherein the fluid plenum is defined by a fluid manifold and a composite layer. The fuel is contacted with anode components and an oxidant is contacted with cathode components to generate power.

In still more embodiments, the present invention includes methods of making a planar fuel cell assembly. The methods comprise providing a composite layer that includes a plurality of interconnect components and a plurality of electrode components disposed on a first side and a second side of the composite layer, the electrode components including anode components and cathode components. The first side is opposite the second side. At least one intrusion is formed in the first side of the composite layer, the at least one intrusion extending completely through a first electrode component and partly through the interconnect component underlying the first electrode component. A first bonding material is deposited in the at least one intrusion, the first bonding material contacting both the first electrode component and the interconnect component underlying the first electrode component. A fluid manifold is bonded over the at least one intrusion, wherein the fluid manifold is bonded to the first side of the composite layer by the first bonding material.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1A:
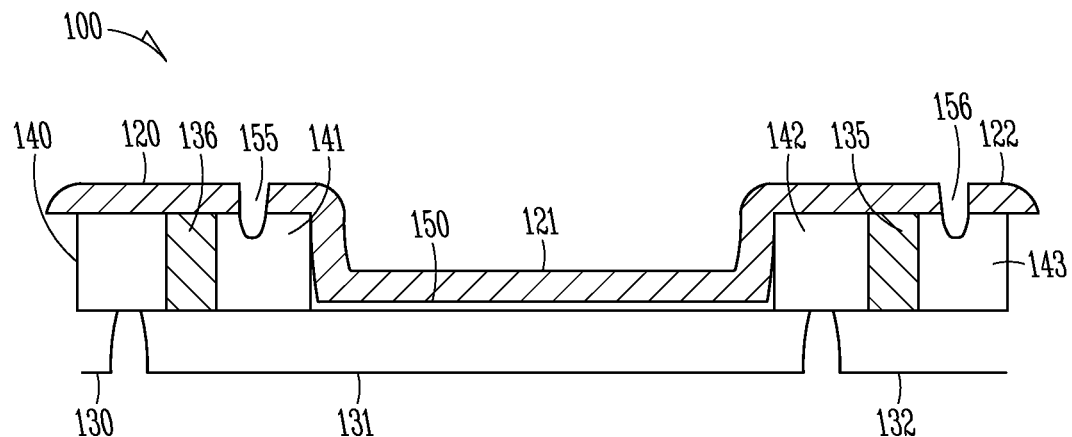
FIGS. 1A and 1B illustrates cross-sectional views of a fuel cell system of the invention.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different direction in relation to the center of a component and the terms "upper" and "lower" or "inferior" and "superior" may be used to describe two different surfaces of the composite. However, these terms are used merely for ease of description and are not to be understood as fixing the orientation of a fuel cell layer or the described embodiments. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100 shall also include the ranges 1-80, 2-76, or any other numerical range that falls between 1 and 100. In another example, a disclosed range of "1,000 or less" shall also include any range that is less than 1,000, such as 50-100, 25-29, or 200-1,000.

Portable electronic devices (e.g., mobile phones, laptop computers, computer accessories, displays, personal audio or video players, medical devices, televisions, transmitters, receivers, lighting devices including outdoor lighting or flashlights, electronic toys, power tools or any device conventionally used with batteries) are trending to become smaller in size while increasing the demand for performance. Thus, fuel cell systems may need to occupy only a small volume of the overall electrical device volume. The drive for compact power sources requires that a fuel cell have a high specific power (i.e., power density) to provide the demanded power in the smallest possible space and maximize the volume available for fuel.

In addition to being as small as possible, it is advantageous if the fuel cell also has an overall shape that is conducive to working well in a portable power application. Shapes that are planar may enable the fuel cell to be integrated as a power source without making large demands on the format of the overall system being supplied with power by the fuel cell. As fuel cell layers with higher power output are configured in planar formats, the overall surface area of the fuel cell layer increases which tends to increase internal forces due to pressurization of the larger reactant plenums. This pressurization acts over larger areas which creates larger forces and stresses on various parts of the planar fuel cell layer, such as perimeter seals used to hold the layers of the planar fuel cell together and any internal support structures that may be present. Examples of internal support structures may be found in U.S. Patent Application Publication No. 2009/0081493 by Schrooten, et al. entitled "Fuel Cell Systems Including Space-Saving Fluid Plenum and Related Methods," the entire disclosure of which is herein incorporated by reference in its entirety. Some embodiments of the present invention include fuel cell systems having the internal support structures described in US2009/0081493.

Fuel cells for use in portable applications may have air breathing cathodes which are exposed to the ambient environment, either directly or via some low-pressure drop ducting. In order to drive fuel into the cell and sustain fuel consumption at high power operation, the fuel (which may be a gas or a liquid) may be maintained at some positive pressure relative to the outside environment. Therefore, the layered fuel cell structure contains a fuel plenum defined at least in part by the configuration of the layers, which must be sealed to prevent leakage of the fuel from the system.

The present invention provides methods, systems, and articles relating to enhanced methods of bonding layers of a planar fuel cell. Specifically, the present invention provides methods, systems, and article relating to a planar fuel cell having a composite layer that is bonded to an outer layer (e.g., a fuel or fluid manifold) using intrusions spanning an electrolyte layer and extending into an underlying layer (e.g., a substrate component or a current-collector component). As used herein, an "intrusion" can be a channel (e.g., as further explained below, such as those in FIGS. 1A and 1B) or cavities (e.g., as further explained below, such as those shown in FIG. 4).

Figure 1B:
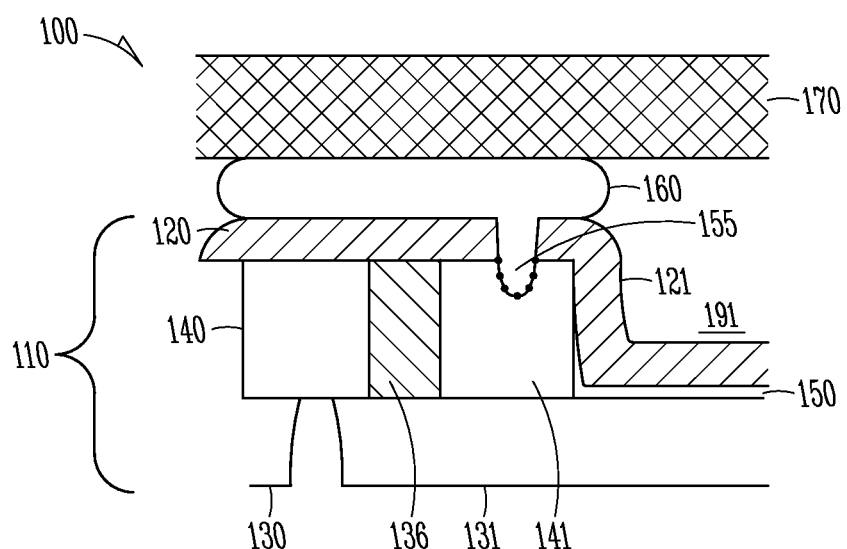

FIGS. 1A and 1B illustrate cross-sectional views of a portion of one embodiment of the invention that includes fuel cell system 100. FIG. 1B illustrates a view that is more magnified than that shown in FIG. 1A.

Fuel cell system 100 includes composite layer 110. Composite layer 110 includes a number of components arranged to form a planar array of unit fuel cells, including electrode regions in the form of anode regions 120, 121, and 122 and cathode regions 130, 131, and 132. Anode regions 120, 121, and 122 are disposed on a first surface of composite layer 110 and cathode regions 130, 131, and 132 are disposed on a second surface of composite layer 110 opposite the first surface. Sandwiched between the anode and cathode regions are electron-conducting regions 135 and 136 (also referred to as "electrically-conductive regions"); dielectric regions 140, 141, 142, and 143; and ion-conducting region 150. The arrangement of anode and cathode regions within composite layer 110 creates an electrical connection of adjacent anode and cathode regions to form a series addition of fuel cell voltages when the system is in operation. In some embodiments of the invention, the composite layer includes additional layers of material bonded or otherwise disposed on the top or bottom surfaces of the electrode regions, such as materials that form a gas seal or barrier or performance enhancing layers (PELs) or conductive carbon overlay (CCO) media, or gas diffusion layers (GDLs). Examples of such media may be found in PCT Patent Application Publication No. WO2011/079378, entitled "Performance Enhancing Layers for Fuel Cells" by Hou, et al., the disclosure of which is herein incorporated by reference in its entirety.

In the embodiments illustrated herein, electron-conducting regions and dielectric regions are sometimes referred to collective as an "interconnect" or an "interconnect region." For example, in FIGS. 1A and 1B, electron-conducting region 135 together with dielectric regions 142 and 143 form an "interconnect" or "interconnect region." Similarly, electron-conducting region 136 together with dielectric regions 140 and 141 form another "interconnect" or "interconnect region." The dielectric regions and electron-conducting regions may be bonded together to form a composite interconnect structure. Further examples of interconnects that may be employed with the present invention are described in U.S. Patent Application Publication 2011/0165495 and 2012/0003568, both by Schrooten, et al. and entitled "Apparatus and Methods for Connecting Fuel Cells to an External Circuit." The disclosures of both of these publications are hereby incorporated in their entirely by reference. In some embodiments of the invention, dielectric regions may be a substrate or substrate components.

Channels 155 and 156 have been carved into, or otherwise formed in, the interconnects defining the first surface of composite layer 110. Channel 155 extends past and electrically separates anode regions 120 and 121, and channel 156 extends past and electrically separates anode regions 121 and 122. Channel 155 also extends into dielectric region 141, while channel 156 extends into dielectric region 143.

The exact dimensions and orientation of the channels of the invention may vary depending upon such factors as the needs of a given application, the dimensions of the associated fuel cell system, and the dimensions of the interconnects in which they are formed. If, for example, a laser is used to form the channels and a channel is formed too deeply, the laser may burn through the dielectric region and into the underlying cathode or anode region. Additionally, if the channel has a diagonal orientation (as described in more detail below), forming the channel too deeply may result in the channel impinging on the neighboring electron-conducting region and forming a leak in the composite layer or weakening the electron-conducting region such that the electron-conducting region may split when the array is under pressure. In addition to channel depth, the orientation of the channel should also be considered. If orientated too closely to a neighboring electron-conducting region or a neighboring ion-conducting region. In addition to channel depth and orientation relative to other components of a composite layer, the width of the channel should be considered. Forming a relatively wide channel may increase the likelihood that a cutting tool (e.g., a cutting laser) will impinge into neighboring components or regions. If a channel is too narrow, it may increase the likelihood that electrical short circuits occur between neighboring cathode and anode regions. In some embodiments, the channels are between about 60 and about 100 microns (μm) wide and about 80 and 105 microns (μm) deep. In some embodiments, the channels are orientated such that the channels edge is between about 70 and 110 microns (μm) from the edge of a neighboring electron-conducting region. In such embodiments, the interconnects may be between about 0.5 to about 5 mm wide, or about 0.7 to about 3 mm wide, and between about 0.1 to about 0.5 mm thick. In other embodiments, much smaller and shallower channels may be formed, for example in embodiments with interconnects as thin as about 20 to about 100 microns. Within the width of the interconnect, the widths of the dielectric and electron-conducting regions may be about the same, or may be different from one another. Each interconnector may have one or more dielectric regions, and one or more electron-conducting regions. In some embodiments, the material used for each of these regions may be varied. Further examples of such composite interconnects may be found in U.S. Patent Application Publications 2011/0165495 and 2012/0003568, both entitled "Apparatus and Methods for Connecting Fuel Cells to an External Circuit", the disclosures of which are herein incorporated by reference in their entireties.

Adhesive material 160 (shown in FIG. 1B) may overlie a portion of upper or superior surface of anode regions 120 and 121 and extend into channel 155 to contact and bond to the interconnect formed by dielectrics 140 and 141 and electron-conducting region 136 and to contact and bond to the surface of dielectric region 155 defining channel 155. Fuel manifold layer 170 is disposed on top of, or superior to, adhesive material 160, thereby forming fuel plenum 191 defined superiorly by fuel manifold layer 170 and inferiorly by anode region 121. Adhesive material 160 contacts and bonds fuel manifold layer 170 to anode regions 120 and 121 and to the interconnect formed by dielectrics 140 and 141 and electron-conducting region 136. Fuel manifold layer 170 can be, for example, a fluid manifold like those taught in U.S. Patent Application Publication 2009/0081493, by Schrooten, et al. and entitled "Fuel Cell Systems Including Space-Saving Fluid Plenum and Related Methods," the entire teachings of which are incorporated herein by reference.

Adhesive material 160 can be made of an adhesive that provides desired physical and performance characteristics. Of course, the exact characteristics needed may vary depending upon the demands of a given application, but common design considerations can include an adhesive material's resistance to accumulation of water vapor, resistance to thermal fluctuations, and the ability to withstand pressure cycling. Further considerations may include an adhesive material's tendency to sag during dispensing and curing operations, its suitability for high speed dispensing, its compatibility with accelerated curing, its curing temperature, its pot life, its shelf life, its shrinkage values, its bubble content, its price, its strength, its flexibility, and its outgassing. In some applications the adhesive material may be electrically insulating and will not contaminate the other portions of the fuel cell system. In some embodiments, adhesive material 160 may be, for example, an epoxy or polyurethane based adhesive. In further embodiments, adhesive material 160 may be a UV-cured or hot melt adhesive. Specific examples of suitable adhesive materials may include Araldite 2041 polyurethane adhesive (available from Huntsman International LLC of The Woodlands, Tex.), IRS 2125 epoxy adhesive (available from Intertronics Co. of Oxfordshire, England), DP125 epoxy adhesive (available from 3M Company of St. Paul, Minn.), DP190 epoxy adhesive (available from 3M Company of St. Paul, Minn.), or 3549 urethane adhesive (available from 3M Company of St. Paul, Minn.).

Channels 155 and 156 may be formed by, for example, laser cutting through the anode region (to then form separate anode regions 120 and 121) and into the underlying dielectric region 141. Since channels 155 and 156 extend into dielectric regions 141 and 143, the overlying adhesive material (e.g., adhesive material 160, in the case of electron-conducting region 141) is able to bond to a greater amount of surface area than compared to a channel that does not extend past an anode layer. In this way, fuel cell system 100 provides for an enhanced bond between fuel manifold 170 and composite layer 110.

While FIGS. 1A and 1B illustrate channels extending through an anode layer and into the underlying dielectric region of a planar fuel cell, the present invention is not limited to embodiments where a channel extends into dielectric regions of interconnects. In some embodiments, the invention includes a composite layer comprising channels that extend through the anode or cathode layers of a planar fuel cell and into the underlying layer, such as an underlying substrate or electron-conducting region or other portions of an interconnect region. Also, the present invention is not limited to embodiments having the specific arrangement of regions and components illustrated in FIGS. 1A and 1B, but may include any planar fuel cell layer architecture where channels are formed that extend through an anode or cathode layer and into the underlying sub-layer. For example, the following publications describe embodiments of fuel cells and composite fuel cell layers to which this invention may be applied:

1) PCT Patent Application Publication WO 2011/079377 entitled "Fuel Cells and Fuel Cell Components Having Asymmetric Architecture and Methods Thereof";

2) U.S. Pat. No. 7,632,587 entitled "Electrochemical Cells Having Current-Carrying Layers Underlying Catalyst Layers";

3) U.S. Patent Application Publication 2010/0183955 entitled "Electrochemical Cells Having Current-Carrying Structures Underlying Electrochemical Reaction Layers";

4) U.S. Patent Application Publication 2009/0081493 entitled "Fuel Cell Systems Including Space-Saving Fluid Plenum and Related Methods";

5) U.S. Patent Application Publication 2011/0003229 entitled "Electrochemical Cells and Membranes Related Thereto";

6) U.S. Pat. No. 7,205,057 entitled "Integrated Fuel Cell and Heat Sink Assembly"

7) U.S. Patent Application Publication 2009/0297895 entitled "Systems and Methods for Managing Heat in Portable Electronic Devices";

8) U.S. Pat. No. 8,129,065 entitled "Electrochemical Cell Assemblies Including a Region of Discontinuity."

The above-referenced documents are hereby incorporated in their entirety and the present invention includes any of the methods, components, or systems described in the above-referenced documents modified to includes a channel or gap that extends through an electrode layer and into a layer or component underlying the electrode layer (e.g., a substrate region or component, a dielectric region or component, an ion-conducting region or component, or an electron-conducting region or component). For example, WO 2011/079377 illustrates a number of different embodiments that includes gaps or channels that extend through an electrode layer to form neighboring electrode regions. The present invention includes any of the fuel cell embodiments taught in WO 2011/079377 with a difference that the gaps or channels extend through an electrode layer and into the underlying component layer (e.g., a substrate region or component, an ion-conducting region or component, or an electron-conducting region or component) in which is disposed an adhesive or other materials that bond another layer of the fuel cell system (e.g., a fluid manifold layer) to the composite layer. The above-referenced patents and patent publications are incorporated herein in their entirety.

Figure 2A:
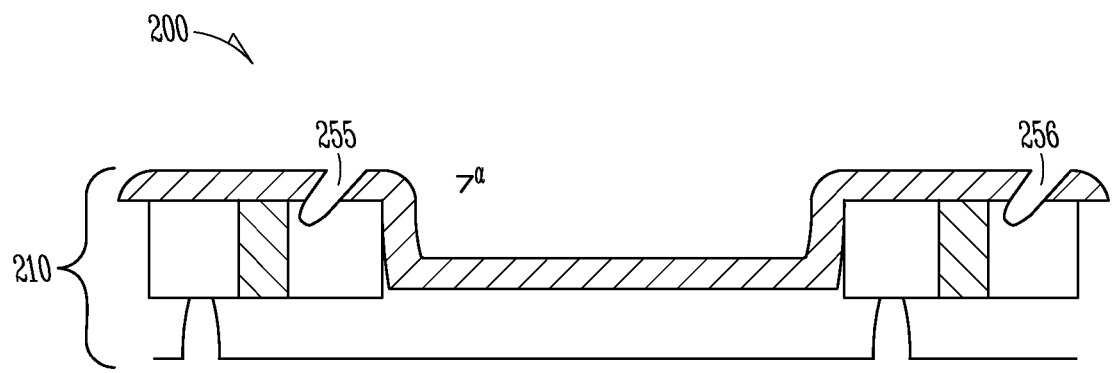
FIGS. 2A and 2B illustrate cross-sectional views of a portion of a fuel cell system of the invention.
Figure 2B:
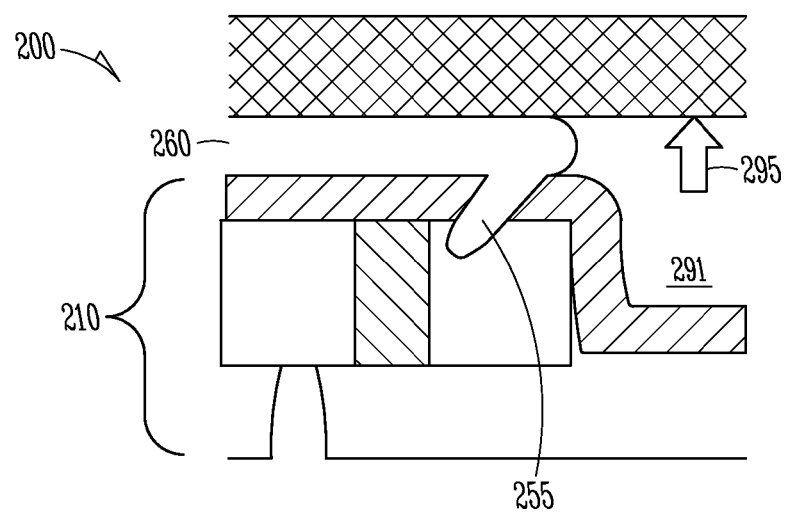

FIGS. 2A and 2B illustrate cross-sectional views of another portion of one embodiment of the invention that includes fuel cell system 200. FIG. 2B illustrates a view that is more magnified than that shown in FIG. 2A.

Fuel cell system 200 includes composite layer 210, which is similar to composite layer 110 illustrated in FIGS. 1A and 1B with the exception that channels 255 and 256 extend into the first surface of composite layer 210 in a diagonal direction. Channels 255 and 256 extend into the first surface of composite layer 210 at an angle α relative to the first surface of composite layer 210. Angle α can be, for example, less than 90°. Forming channels 255 and 256 in a diagonal direction provides for increased resistance to delamination of adhesive material 260 due to pressure from a fuel in fuel plenum 291. The pressure of a fuel in fuel plenum 291 is directed up in direction 295, placing a stress upon adhesive material 260 in channel 255. Since channel 255 is at a diagonal relative to the surface of the first surface of composite layer 210 (and direction 295 of the pressure produced by the presence of fuel in plenum 291), the adhesive in channel 255 may provide an anchoring effect and resist peeling of layers bonded to the composite layer.

Figure 3A:
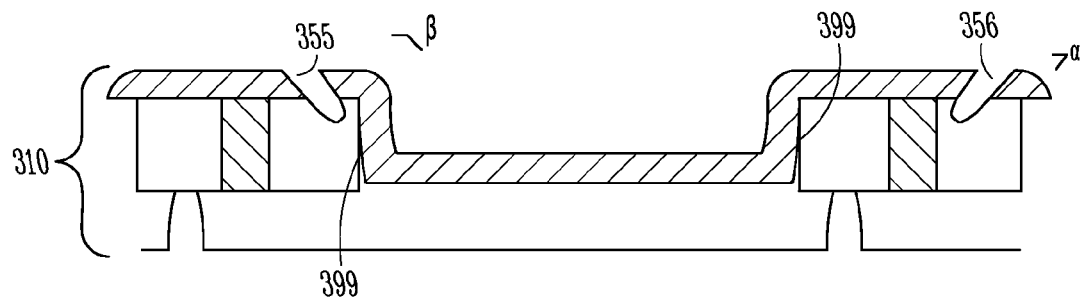
FIGS. 3A and 3B illustrate an embodiment of the invention where channels are formed at opposite angles relative to a first surface of a composite layer.
Figure 3B:
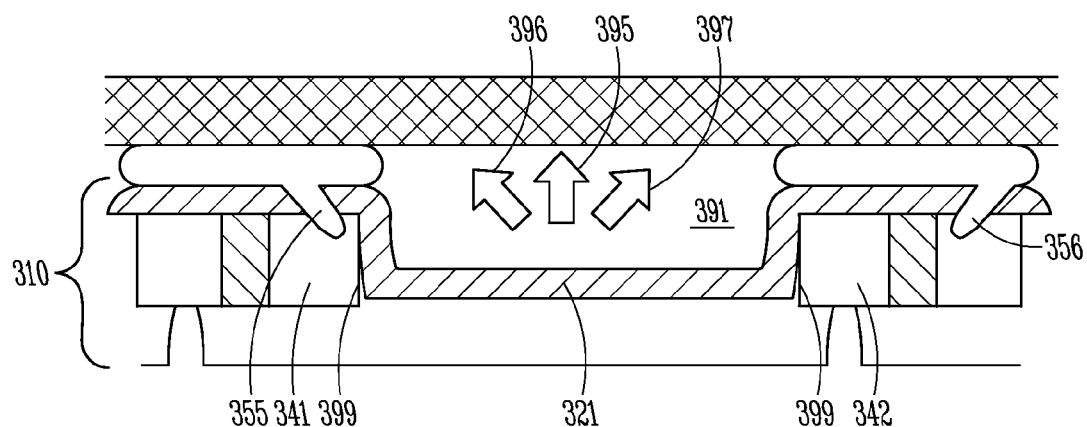

In further embodiments, one or more of the channels in the composite layer are formed at an angle that is greater than 90° relative to the first surface of a composite layer. FIGS. 3A and 3B illustrate one embodiment of the invention where channels 355 and 356 are formed at opposite angles relative to a first surface of composite layer 310. Channel 355 extends at an angle β relative to a first surface of composite layer 310, while channel 356 extends at an angle α relative to the first surface. Angle β is greater than 90° (e.g., an angle of 91-179°) while angle α if less than 90° (e.g., an angle of 1°-89°). Composite layer 310 provides an enhanced bond that resists forces applied from fuel that may be present in plenum 391, which can create anchoring forces even when subjected to forces in a multitude of direction (e.g., directions 396, 395, and/or 397).

In some embodiments, angle β is 90° greater than angle α. In further embodiments, the invention includes a composite layer having a plurality of channels formed at angles to a first surface that are disparate from one another.

The channels of the present invention may be formed by laser cutting or some other cutting method, such as a water jet process, an abrasive jet process, a chemical etchin process, a mechanical machining process (e.g., sawing, grinding, etc.), or a die punching process. In some embodiments, the invention provides a layer for protecting components of the composite layers from a cutting laser. For example, the electrode layer and underlying component or layer subject to a cutting laser may include a protective layer that prevents the cutting layer from unintentionally cutting through other portions of the electrode layer. For example, FIG. 3B illustrates that current collectors 341 and 342 may include a protective layer 399 that prevent a cutting laser from damaging anode layer 321. Protective layer 399 may be formed, for example, by the addition of further dielectric material disposed on the interconnect regions. Alternatively, the protective layer may be formed by modifying the composition of the dielectric region of the interconnect, for example, to make it less permeable to laser radiation. Examples of such protective layers may be found in U.S. patent application Ser. No. 13/306,253, entitled "Fuel Cell Layer" by Fujita, et al., the disclosure of which is incorporated herein by reference in its entirety.

Figure 4:
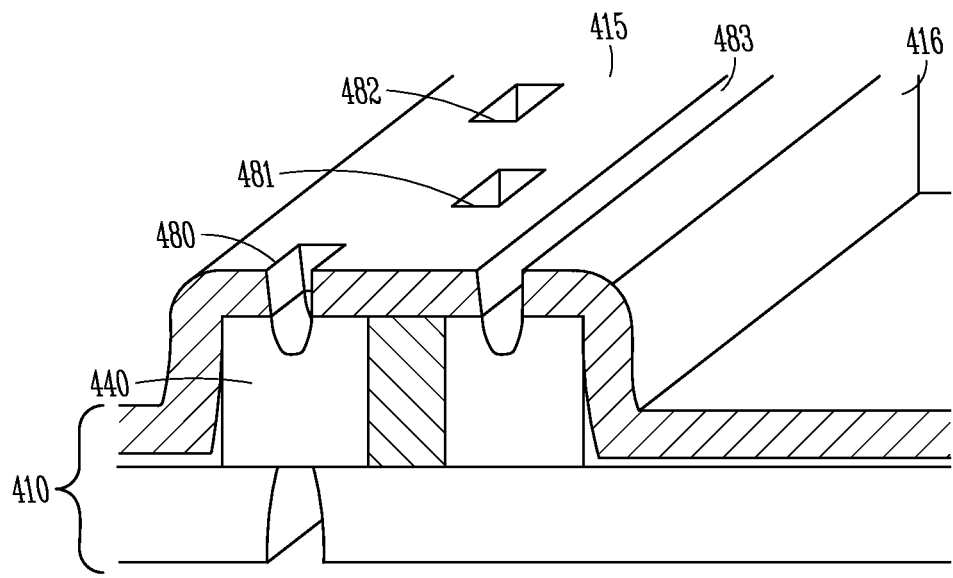
FIG. 4 illustrates an embodiment of the invention that includes a prospective side-view of a portion of a composite layer.

In some embodiments, the invention includes composite layers having channels that bisect an electrode layer to form gaps between neighboring electrode regions (i.e, channels that isolated neighboring electrode regions from direct electrical communication between one another). However, in some embodiment, the invention includes composite layers having gaps formed in anode or cathode regions that do not form electrically-isolating gaps between neighboring electrode regions. For example, FIG. 4 illustrates one embodiment of the invention that includes a perspective side-view of a portion of composite layer 410 that includes cavities 480, 481, and 482 and channel 483. Cavities 480, 481 and 482 do not span across the entire length of the first surface of composite layer 410 but instead span across only a portion of the entire length of the first surface of composite layer 410. Channel 483, on the other hand, spans the entire length of the first surface of composite layer 410. Hence, channel 483 separates the anode layer of composite layer 410 into anode region 415 and 416. Anode region 415 and 416 do not contact one another. Cavities 480, 481, and 482 extend intermittently across the width of composite layer 410 and provide locations for increased bonding area between composite layer 410 and an overlay layer such as a fluid manifold (not illustrated in FIG. 4). In some embodiments, the invention includes a composite layer having intermittently spaced channels or cavities that extend at different or similar angles relative to the first surface of the composite layer. Cavity 481 may extend or intrude into an underlying conductive region.

In still further embodiments, gaps may be formed on a smaller scale, such as through use of a porous material for creation of anode layers in the fuel cell layer. In such embodiments, the porosity of the material used to create the anode layers may be homogeneously or heterogeneously porous. For example, the material may have an increased porosity in proximity to the interface regions to provide additional bonding surface area between the composite layer and the fluid manifold, but may have a different porosity in proximity to the ion-conducting regions. The porosity in proximity to the ion-conducting regions may be adjusted so as to optimize properties associated with the electrochemical reaction.

Figure 5:
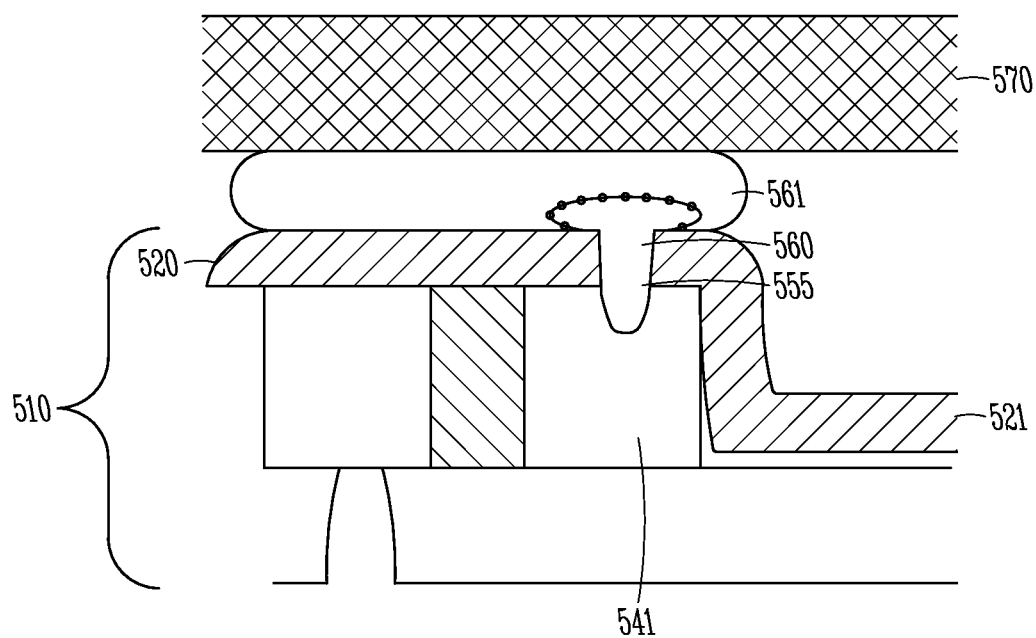
FIG. 5 illustrates an embodiment of the invention having a channel that extends through anode regions and into an electron-conducting region.

In further embodiments, the invention provides a composite layer that includes channels and two or more different adhesive or bonding materials. FIG. 5 illustrates such an embodiment and includes composite layer 510 having channel 555 extending through anode regions 520 and 521 and into dielectric region 541. First adhesive material 560 is deposited within channel 555 and overflows channel 555 so that a portion of first adhesive material 560 overlies anode regions 520 and 521. Second bonding or adhesive material 561 is disposed over first adhesive material 560 and is bonded to fluid manifold 570, the superior surfaces of first adhesive material 560, and anode regions 520 and 521. In some embodiments, the first and second adhesive materials have dissimilar properties. For example, the first adhesive material may be more or less impermeable to gas diffusion than the second adhesive material. In other examples, the first adhesive material may be more or less rigid than the second adhesive material.

In yet further embodiments, the present invention includes interrupts that extend through an electrode region but not into the underlying interconnect components. Interrupts that do not extend into the underlying interconnect components may provide enhanced bonding between a composite layer and an overlying layer (e.g., a fluid manifold layer) compared to planar fuel cells that lack interrupts.

The above description is intended to be illustrative, and not restrictive. Other embodiments can be used, such as by one of ordinary skill in the art upon reviewing the above description. For example, elements of one described embodiment may be used in conjunction with elements from other described embodiments. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed, is:

1. A planar fuel cell assembly comprising:
    a composite layer that includes a plurality of interconnect components and a plurality of ion-conducting components;
    a plurality of electrode components disposed on a first side and a second side of the composite layer, the electrode components including a plurality of anode components and a plurality of cathode components, wherein the first side is opposite the second side;
    at least one intrusion formed in the first side of the composite layer, the at least one intrusion extending completely through a first electrode component and partly through the interconnect component underlying the first electrode component;
    a first bonding component disposed in the at least one intrusion and contacting the first electrode component and the interconnect component underlying the first electrode component; and
    a fluid manifold disposed over the at least one intrusion and bonded to the composite layer by the first bonding component.

2. The planar fuel cell assembly of claim 1, wherein the at least one intrusion is a channel.

3. The planar fuel cell assembly of claim 1, wherein the at least one intrusion is a cavity.

4. The planar fuel cell assembly of claim 1, wherein the at least one intrusion is formed at a right angle to the first side of the composite layer.

5. The planar fuel cell assembly of claim 1, wherein the at least one intrusion is formed at an angle to the first side of the composite layer that is less than 90 degrees.

6. The planar fuel cell assembly of claim 1, wherein the composite layer includes at least two intrusions, including a first channel and a second channel, and wherein the first channel is formed at an angle to the first side of the composite layer that is less than 90 degrees and the second channel is formed at an angle to the first side of the composite layer that is greater than 90 degrees.

7. The planar fuel cell assembly of claim 1, wherein the composite layer includes at least two intrusions, including a first channel and a second channel, and wherein the first channel and the second channel are both formed at an angle to the first side of the composite layer that is less than 90 degrees.

8. The planar fuel cell assembly of claim 1, wherein the at least one intrusion provides an insular gap between neighboring electrode components.

9. The planar fuel cell assembly of claim 1, wherein the planar fuel cell assembly includes at least two channels formed in a single electrode component.

10. The planar fuel cell assembly of claim 1, wherein the at least one feature includes a patterned anode component.

11. The planar fuel cell assembly of claim 1, further including a second bonding component disposed over the first bonding component, wherein the second bonding component is different than the first bonding component and the second bonding component is bonded to the fluid manifold.

12. The planar fuel cell assembly of claim 11, wherein the first bonding component is less gas permeable than the second bonding component.

13. The planar fuel cell assembly of claim 11, wherein the first bonding component is more rigid than the second bonding component.

14. The planar fuel cell assembly of claim 11, wherein at least a portion of the first bonding component overlies the first side of the composite layer.

15. The planar fuel cell assembly of claim 1, wherein the interconnect components each include at least one electron-conducting component and at least one dielectric component.

16. The planar fuel cell assembly of claim 15, wherein the intrusion extends into the dielectric component or the electron-conducting component.

17. The planar fuel cell assembly of claim 1, wherein the bonding component includes an adhesive material.

18. A method of generating power, the method comprising:
    providing the planar fuel cell assembly of claim 1;
    directing a fuel into a fluid plenum, wherein the fluid plenum is defined by the fluid manifold and the composite layer;
    contacting the anode components with the fuel and the cathode components with an oxidant to generate power.

* * * * *